(12) United States Patent
Hanaoka et al.

(10) Patent No.: US 12,149,064 B2
(45) Date of Patent: *Nov. 19, 2024

(54) POWER SUPPLY SYSTEM, GROUND FAULT DETECTION METHOD AND PROGRAM

(71) Applicant: Nippon Telegraph and Telephone Corporation, Tokyo (JP)

(72) Inventors: Naoki Hanaoka, Musashino (JP); Hidetoshi Takada, Musashino (JP); Toshimitsu Tanaka, Musashino (JP); Masaki Kozai, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 189 days.

This patent is subject to a terminal disclaimer.

(21) Appl. No.: 17/924,301

(22) PCT Filed: May 18, 2020

(86) PCT No.: PCT/JP2020/019677
§ 371 (c)(1),
(2) Date: Nov. 9, 2022

(87) PCT Pub. No.: WO2021/234789
PCT Pub. Date: Nov. 25, 2021

(65) Prior Publication Data
US 2023/0187924 A1   Jun. 15, 2023

(51) Int. Cl.
*H02H 3/00* (2006.01)
*H02H 3/16* (2006.01)

(52) U.S. Cl.
CPC .................... *H02H 3/16* (2013.01)

(58) Field of Classification Search
None
See application file for complete search history.

(56) References Cited

U.S. PATENT DOCUMENTS

| | | | |
|---|---|---|---|
| 2016/0352091 A1* | 12/2016 | Qi | H02H 3/10 |
| 2020/0136389 A1* | 4/2020 | Leon Garcia | H02H 7/268 |
| 2020/0144807 A1* | 5/2020 | Garrison | H02H 7/268 |
| 2023/0178975 A1* | 6/2023 | Hanaoka | H02J 1/00 361/93.1 |

OTHER PUBLICATIONS

Seiko Electric Co, Ltd., "SDLOA-1A-E type DC ground fault detector," seiko-denki.com.jp, retrieved on Apr. 28, 2020, retrieved from URL <https://www.seiko-denki.co.jp/wp/wp-content/uploads/2018/08/SEIKO_SDLOA-1A-E-type_defaultdetector_chademo_ed.2.pdf>, 9 pages (with English Translation).

* cited by examiner

*Primary Examiner* — Stephen W Jackson
(74) *Attorney, Agent, or Firm* — Fish & Richardson P.C.

(57) ABSTRACT

A feeding system that feeds power to a load includes only a single device configured to have neutral point high-resistance between a feeding line and the earth. The device functions as a ground fault overvoltage detection type of ground fault detector. The feeding system further comprises a control device. When the ground fault overvoltage detection type of ground fault detector detects a ground fault, the ground fault overvoltage detection type of ground fault detector transmits, to the control device via a signal line, a signal indicating that the ground fault has occurred. The control device instructs a breaker corresponding to the specific distributed unit in which it is determined that the ground fault has occurred to perform breaking.

6 Claims, 10 Drawing Sheets

POWER SUPPLY SYSTEM, GROUND FAULT DETECTION METHOD AND PROGRAM

CROSS-REFERENCE TO RELATED APPLICATIONS

This application is a National Stage application under 35 U.S.C. § 371 of International Application No. PCT/JP2020/019677, having an International Filing Date of May 18, 2020. The disclosure of the prior application is considered part of the disclosure of this application, and is incorporated by reference in its entirety into this application.

TECHNICAL FIELD

The present invention relates to a technology for detecting a ground fault generated in a feeding system.

BACKGROUND ART

In communication buildings, data centers, or the like, high-voltage direct-current feeding systems are introduced to reduce power loss of entire systems and achieve energy saving.

In high-voltage direct-current feeding systems, since feeding is performed with a high voltage such as 400 V, for example, a feeding line is grounded with high resistance in a rectifier in order to guarantee safety.

With regard to high-voltage direct-current feeding systems, there is a technology of the related art for detecting a ground fault (electric leakage) by combining a ground fault overvoltage detection type of ground fault detector and an unbalanced current detection type of ground fault detector. NPL 1 discloses an example of a ground fault detector that detects a ground fault by grounding a neutral point of a circuit.

CITATION LIST

Non Patent Literature

[NPL 1] Seiko Electric Co., Ltd SDLOA-1 A-E direct-current ground fault detector, https://www.seiko-denki.co.jp/wp/wp-content/uploads/2018/08/SEIKO_SDL0A-1A-E-type_dcfaultdetector_chademo_ed.2.pdf, retrieved on Apr. 28, 2020

SUMMARY OF THE INVENTION

Technical Problem

A ground fault overvoltage detection type of ground fault detector used in a high-voltage direct-current feeding system in the related art has a configuration similar to high-resistance neutral point grounding in a rectifier or the like, and performs neutral point grounding with high resistance to detect a ground fault by changing a voltage between both ends of resistance.

From the viewpoint of the entire feeding system with the foregoing configuration, high resistance originally embedded in a feeding system and high resistance in a ground fault overvoltage detection type of ground fault detector are connected in parallel between a feeding line and the earth. With extension of a system, the number of high resistances connected in parallel is likely to increase.

Even in a device that has high resistances between a feeding line and the earth, resistance of the entire system to the earth decreases when a plurality of high resistances are connected in parallel. When the resistance of the entire system to the earth decreases, there is a possibility of a problem occurring in safety of the system.

The present invention has been devised in view of the foregoing circumstances and an objective of the present invention is to provide a technology capable of detecting a ground fault safely without causing resistance to the earth in a feeding system to deteriorate.

Means for Solving the Problem

According to the technology of the present disclosure, a feeding system that feeds power to a load includes:
a device configured to have neutral point high-resistance between a feeding line and the earth,
wherein the device functions as a ground fault overvoltage detection type of ground fault detector,
wherein the feeding system further comprises a control device, and
wherein, when the ground fault overvoltage detection type of ground fault detector detects a ground fault, the ground fault overvoltage detection type of ground fault detector transmits a signal indicating that the ground fault has occurred to the control device via a signal line.

Effects of the Invention

According to the technology of the present disclosure, it is possible to detect a ground fault safely without causing resistance to the earth in a feeding system to deteriorate.

DESCRIPTION OF EMBODIMENTS

Hereinafter, an embodiment of the present invention (the present embodiment) will be described with reference to the drawings. The embodiment to be described below is merely exemplary and embodiments to which the present invention is applied are not limited to the following embodiment.

A feeding system according to the embodiment is assumed to be a high-voltage direct-current feeding system (hereinafter referred to as a feeding system) performing feeding with a direct current of 400 V. Here, "400 V" is an example. Applications of the present invention are not limited to the high-voltage direct-current feeding system.

Problem and Overview of Embodiment

Figure 1:
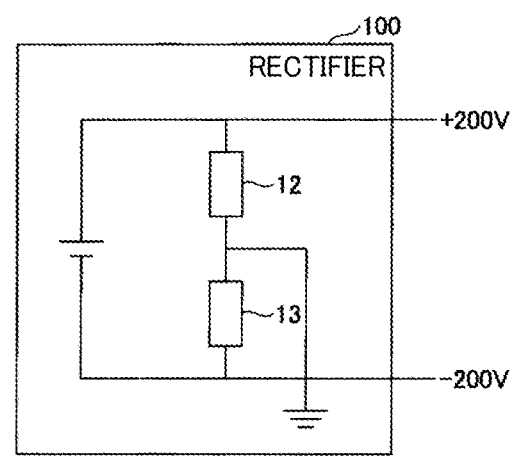
FIG. 1 is a diagram illustrating an example of high-resistance neutral point grounding in a rectifier of a high-voltage direct-current feeding system.

In the feeding system according to the embodiment, a rectifier (also referred to as a power supply) that converts an alternating current into a direct current is used. In the rectifier, the neutral point grounding is performed using high resistances. FIG. 1 illustrates an example of high-resistance neutral point grounding in the rectifier 100 of the feeding system according to the embodiment.

As illustrated in FIG. 1, resistances 12 and 13 are provided between a positive-side feeding line and a negative-side feeding line and are grounded to the earth at a neutral point therebetween. The resistances 12 and 13 are both high resistances of, for example, about a few MΩ.

For example, as disclosed in Japanese Patent Application Publication No. 2019-45321, there is a technology of the related art for detecting a ground fault in a combination of a ground fault overvoltage detection type of ground fault detector and an unbalanced current detection type of ground fault detector in a feeding system including the ground fault overvoltage detection type of ground fault detector and the unbalanced current detection type of ground fault detector.

To detect a ground fault, the feeding system according to the embodiment also includes a ground fault overvoltage detection type of ground fault detector and an unbalanced current detection type of ground fault detector.

An example of the ground fault overvoltage detection type of ground fault detector will be described with reference to FIGS. 2 and 3. The ground fault detector illustrated in FIGS. 2 and 3 has a configuration similar to the configuration of the high-resistance neutral point grounding illustrated in FIG. 1 and has the resistances 4 and 5 (both of which are high resistances) between a positive-side feeding line and a negative-side feeding line. A neutral point between the resistances is grounded to the earth.

Figure 2:
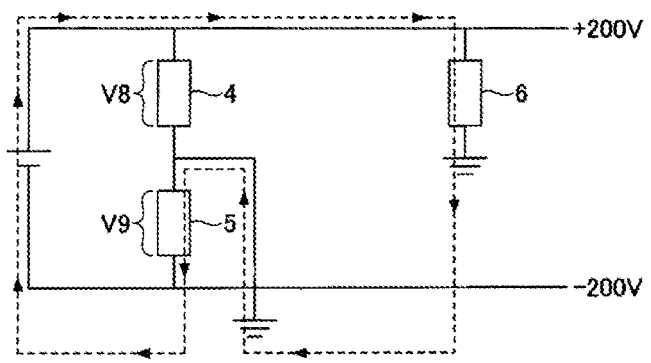
FIG. 2 is a diagram illustrating a ground fault overvoltage detection type of ground fault detector.

Here, as illustrated in FIG. 2, it is assumed that a ground fault has occurred in the positive-side feeding line. That is, it is assumed that the positive-side feeding line is grounded via ground fault resistance 6 (low resistance). In this case, as illustrated in FIG. 2, a ground-fault current flows in a closed circuit formed by a power supply→the ground fault resistance 6→the earth→the negative-side resistance 5→the power supply. Therefore, a voltage V8 at both ends of the positive-side resistance 4 is lowered and a voltage V9 at both ends of the negative-side resistance 5 is raised.

Figure 3:
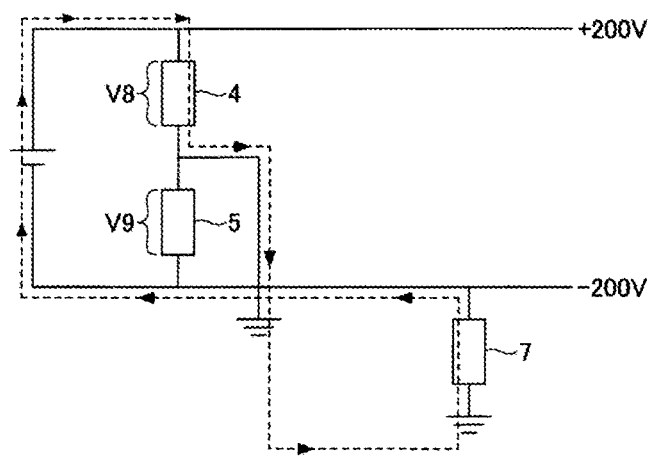
FIG. 3 is a diagram illustrating the ground fault overvoltage detection type of ground fault detector.

As illustrated in FIG. 3, it is assumed that a ground fault has occurred in the negative-side feeding line. That is, it is assumed that the negative-side feeding line is grounded via ground fault resistance 7 (low resistance). In this case, as illustrated in FIG. 3, a ground-fault current flows in a closed circuit formed by a power supply→the positive-side resistance 4→the earth→the ground fault resistance 7→the power supply. Therefore, the voltage V8 at both ends of the positive-side resistance 4 is raised and the voltage V9 at both ends of the negative-side resistance 5 is lowered.

Accordingly, in the ground fault overvoltage detection type of ground fault detector illustrated in FIGS. 2 and 3, by measuring a voltage at both ends of each of the resistances 4 and 5, it can be determined whether a ground fault has occurred and whether the ground fault has occurred in the positive-side feeding line or the negative-side feeding line.

Figure 4:
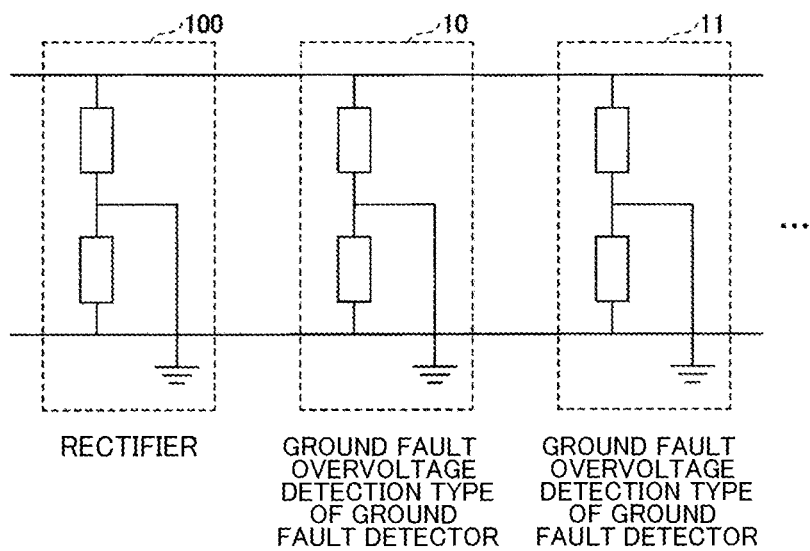
FIG. 4 is a diagram for explaining a problem.

When the rectifier 1 illustrated in FIG. 1 and the ground fault overvoltage detection type of ground fault detector illustrated in FIGS. 2 and 3 are provided in the feeding system, the high resistances 2 and 3 are connected in parallel between the feeding line and the earth and the high resistances 4 and 5 are connected in parallel between the feeding line and the earth. Accordingly, compared to the case in which the high resistances 2 and 3 are provided, the resistance of the feeding system to the earth is lowered. With extension of the system due to an increase or the like of feeding target loads, as illustrated in FIG. 4, adding ground fault overvoltage detection type of ground fault detectors in parallel can be considered, but this further lowers the resistance of the feeding system to the earth. When the resistance of the feeding system to the earth is lowered, a problem of safety can occur.

In the embodiment, to avoid a decrease in a value of resistance to the earth due to parallel connection of the resistance to the earth, a pair of resistances of positive-side resistance and negative-side resistance (which is referred to as neutral point high-resistance) is used as resistance to the earth embedded in the feeding system. It is assumed that the ground fault overvoltage detection type of ground fault detector that has the neutral point high-resistance notifies another portion of a detected ground fault via a signal line.

Overall Configuration of Feeding System According to Embodiment

Figure 5:
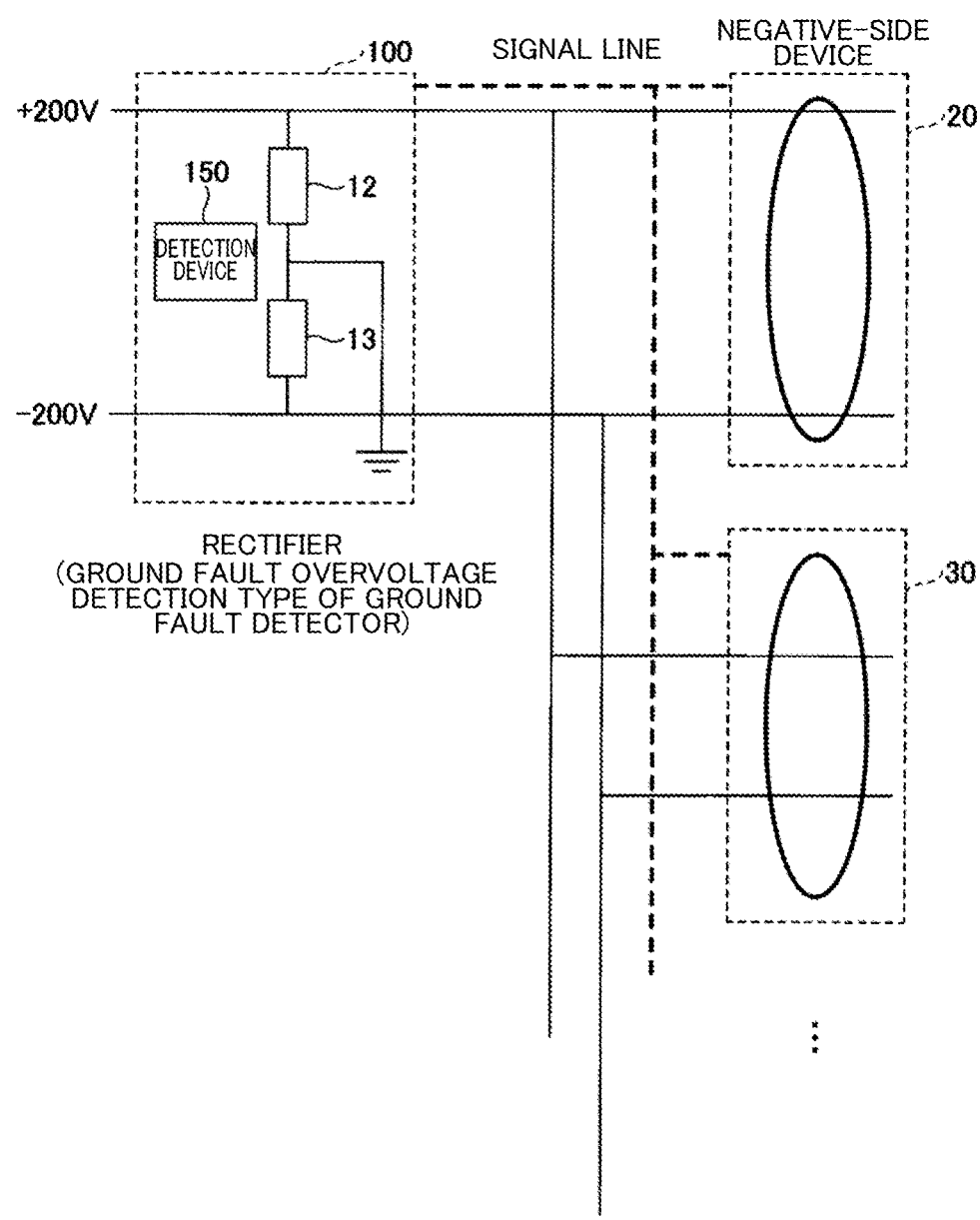
FIG. 5 is a diagram illustrating an overall configuration of a feeding system according to an embodiment of the present invention.

FIG. 5 illustrates an overall configuration of the feeding system according to the embodiment. In the example illustrated in FIG. 5, resistances 12 and 13 provided originally as neutral point high-resistance are used for ground fault overvoltage detection type of ground fault detection in the rectifier 100. The rectifier 100 includes a detection device 150. The detection device 150 detects a ground fault by performing voltage measurement or the like of the resistances 12 and 13. In FIG. 5, a power portion (a portion generating a direct current from an alternating current and outputting the direct current) in the rectifier 100 is not illustrated.

That is, the rectifier 100 is not only a rectifier but also a ground fault overvoltage detection type of ground fault detector.

When neutral point high-resistance grounding is not performed in the rectifier of the feeding system, a device denoted by reference numeral "100" in FIG. 5 is a ground fault overvoltage detection type of ground fault detector 100 that is not a rectifier.

That is, the feeding system according to the embodiment includes only one device that has neutral point high-resistance between a feeding line and the earth. The device functions as a ground fault overvoltage detection type of ground fault detector.

In the example illustrated in FIG. 5, a plurality of negative-side devices 20, 30, . . . are connected in parallel to the rectifier 100 (a ground fault overvoltage detection type of ground fault detector). One negative-side device includes a breaker, an unbalanced current detection type of ground fault detector, and a load. It is not essential to include the plurality of negative-side devices. Only one negative-side device may be included. The unbalanced current detection type of ground fault detector may not be included. Each negative-side device and the rectifier 100 (the ground fault overvoltage detection type of ground fault detector) are connected with a feeding line and are connected to a signal line.

The signal line may be a wired network such as a LAN or may be a wireless network such as a wireless LAN or a 5G network.

When the detection device 150 of the rectifier 100 (the ground fault overvoltage detection type of ground fault detector) detects a ground fault, a signal indicating that the ground fault is detected is transmitted to each negative-side device via the signal line. In the negative-side device, for example, an operation of the breaker breaking a current can be performed based on the signal.

The detection device 150 can transmit, as the signal indicating that the ground fault is detected, any one of, for example, "a signal indicating whether there is a ground fault," "a signal indicating whether there is a ground fault and indicating where the ground fault has occurred between the positive-side feeding line and the negative-side feeding line when there is a ground fault," and "a signal indicating whether there is a ground fault, indicating a voltage value between the positive-side feeding line and a neutral point when there is a ground fault, and indicating a voltage value between the negative-side feeding line and the neutral point when there is a ground fault."

Detailed Configuration of Feeding System

Figure 6:
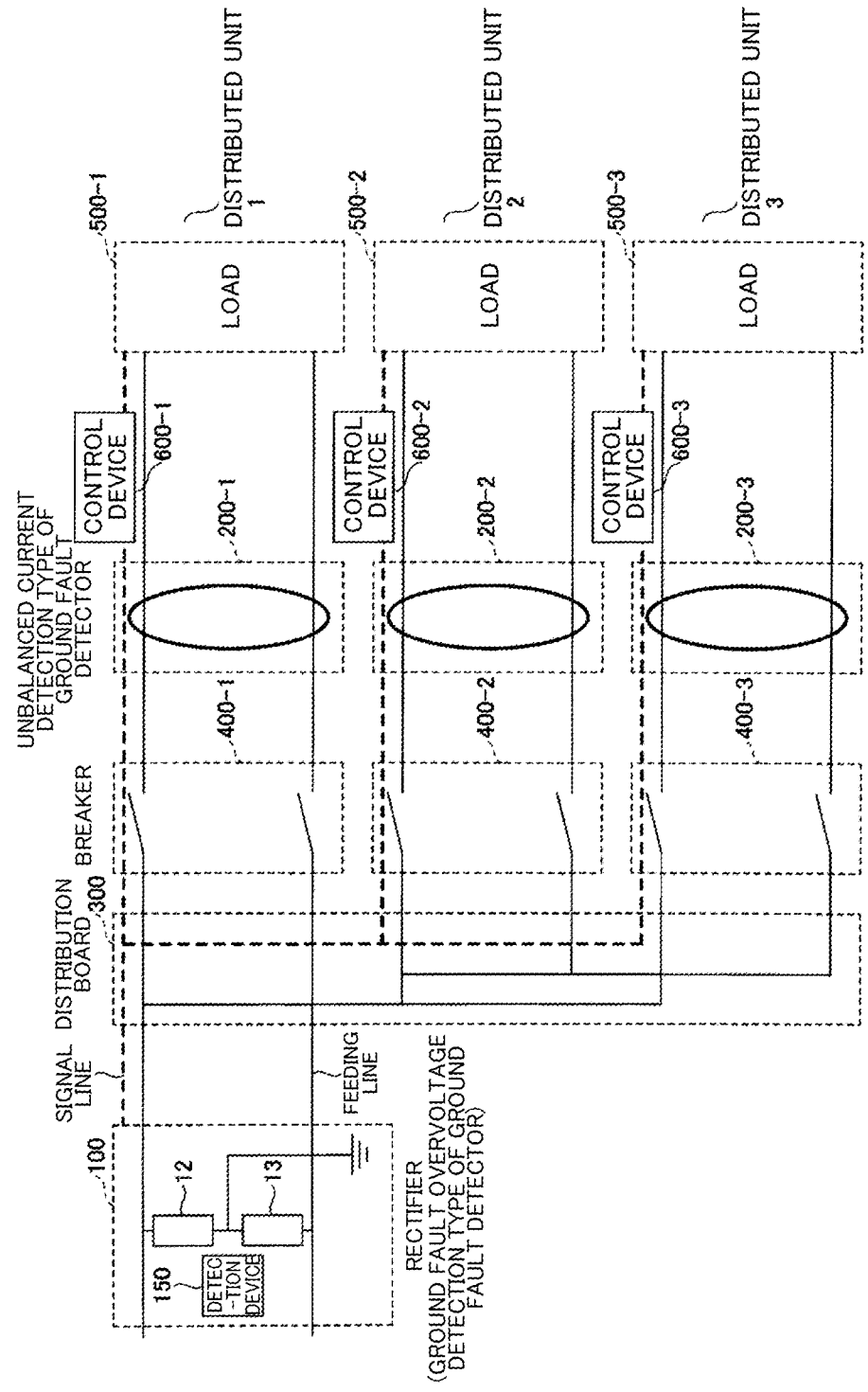
FIG. 6 is a diagram illustrating an exemplary configuration of the feeding system according to the embodiment of the present invention.

Next, an exemplary detailed configuration of the feeding system according to the embodiment will be described. FIG. 6 illustrates an exemplary detailed configuration of the feeding system according to the embodiment.

As illustrated in FIG. 6, the feeding system according to the embodiment includes the rectifier 100 (the ground fault overvoltage detection type of ground fault detector), a distribution board 300, breakers 400-1 to 400-3, an unbalanced current detection type of ground fault detectors 200-1 to 200-3, control devices 600-1 to 600-3, and loads 500-1 to 500-3.

The rectifier 100 (the ground fault overvoltage detection type of ground fault detector) includes the detection device 150 and neutral point high-resistance (the resistances 12 and 13), as described with reference to FIG. 5.

In the feeding system illustrated in FIG. 6, the feeding line extended from the rectifier 100 is distributed into a plurality of feeding lines by the distribution board 300. In the example of FIG. 6, there are three distributions after the distribution board 300. The distributions are referred to as distributed units 1, 2, and 3.

The distributed unit 1 includes the breaker 400-1, the unbalanced current detection type of ground fault detector 200-1, the control device 600-1, and the load 500-1. The distributed unit 2 includes the breaker 400-2, the unbalanced current detection type of ground fault detector 200-2, the control device 600-2, and the load 500-2. The distributed unit 3 includes the breaker 400-3, the unbalanced current detection type of ground fault detector 200-3, the control device 600-3, and the load 500-3.

When the distributed units are not particularly distinguished for each device (the breaker, the unbalanced current detection type of ground fault detector, the control device, and the load) present in each distributed unit, each device in a certain distributed unit is called the breaker 400, the unbalanced current detection type of ground fault detector 200, the control device 600, and the load 500.

Power from the rectifier 100 is supplied to the distribution board 300, the breaker 400-1, the unbalanced current detection type of ground fault detector 200-1, and the load 500-1. Similarly, power is also supplied to the loads 500-2 and 500-. Each device is connected with a signal line, and thus can transmit and receive signals (a notification signal, a control signal, and the like).

The breaker 400 is a device that breaks a current. The breaker 400 may open or a close a switch connected to a feeding line by an electronic device or an electronic circuit, or a fuse may be used. The breaker 400 according to the embodiment can perform a breaking operation based on a signal from the control device 600.

The unbalanced current detection type of ground fault detector 200 includes a zero-phase current transformer (ZCT) and outputs a current (or voltage) generated due to imbalance when there is imbalance in a reciprocating current between a positive-side feeding line and a negative-side feeding line. Alternatively, when it is detected that a value of the current (or voltage) generated due to the imbalance is equal to or greater than a threshold, a signal indicating that a ground fault is detected may be output.

The unbalanced current detection type of ground fault detector 200 can detect a ground fault occurring between the ground fault detector 200 and the load 500, but cannot detect a ground fault occurring between the ground fault detector 200 and the rectifier 200. The rectifier 100 (the ground fault overvoltage detection type of ground fault detector) can detect a ground fault occurring between (in any distributed unit) the rectifier 100 (the ground fault overvoltage detection type of ground fault detector) and the load 500.

The control device 600 receives a signal output from the detection device 150 of the rectifier 100 (the ground fault overvoltage detection type of ground fault detector) and a signal output from the unbalanced current detection type of ground fault detector 200. Based on these signals, it is determined whether it is necessary for the breaker 400 to break a current. When it is necessary to break the current, the breaking is performed.

As illustrated in FIG. 6, the control device 600 may be included for each distributed unit, or only one control device may be included in the feeding system. When the control device 600 is provided for each distribution, the control device 600 performs control in the distributed unit included in the distribution. When the control device 600 is provided for each distribution, each control device 600 can transmit and receive signals to the other control devices 600 via signal lines.

When only one control device 600 is included in the feeding system, the control device 600 receives a signal output from the detection device 150 of the rectifier 100 (the ground fault overvoltage detection type of ground fault detector), receives a signal output from the unbalanced current detection type of ground fault detector 200 of each distributed unit, and controls the breaker 400 of each distributed unit based on the signals.

The load 500 is, for example, an ICT device such as a server, an electric vehicle (EV), or the like. In the example of FIG. 6, the load 500 is connected as a device at the end of the feeding system. However, instead of the load 500, a power generation unit (solar power generation unit or the like) may be connected. For example, power generated by the power generation unit is supplied to loads of other distributed units or is supplied from the rectifier 100 to the outside (a distribution network).

Figure 7:
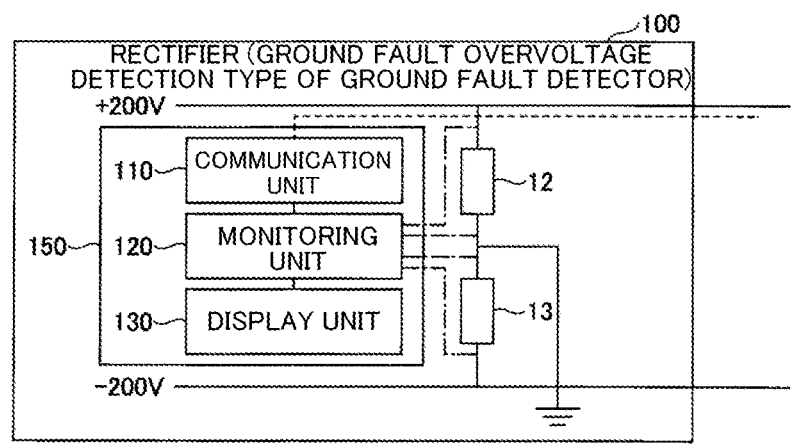
FIG. 7 is a diagram illustrating a configuration of a ground fault overvoltage detection type of ground fault detector.

FIG. 7 illustrates an exemplary configuration of the detection device 150 in the rectifier 100 (the ground fault overvoltage detection type of ground fault detector). As illustrated in FIG. 7, the detection device 150 includes a communication unit 110, a monitoring unit 120, and a display unit 130.

When the monitoring unit 120 detects a ground fault, the communication unit 110 transmits a signal indicating that the ground fault is detected to each control device 600 via the signal line. The monitoring unit 120 monitors, for example, a voltage between both ends of the resistance 12 and a voltage between both ends of the resistance 13. When there is a change equal to or greater than a threshold in the voltage of any resistance, it is determined that there is a ground fault and a signal indicating the detection of the ground fault is output. The output signal is input to the communication unit 110 and the display unit 130. A ground fault detection method to be described here is exemplary.

The display unit 130 may be a display, a lamp, an LED, or the like. When the monitoring unit 120 detects the ground fault, the display unit 130 displays information indicating that the ground fault has occurred on a display or lights a lamp, or the like. The display unit 130 may not be provided.

Figure 8:
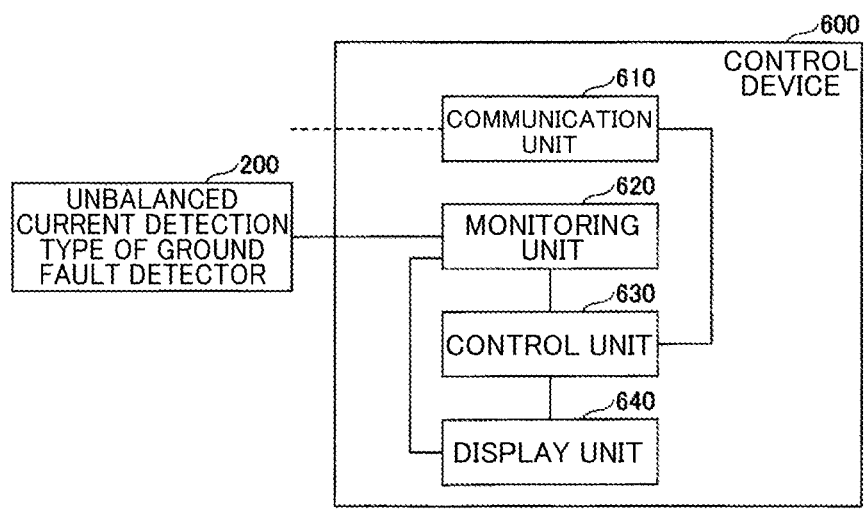
FIG. 8 is a diagram illustrating a configuration of a control device.

FIG. 8 illustrates an exemplary configuration of the control device 600. As illustrated in FIG. 8, the control device 600 includes a communication unit 610, a monitoring unit 620, a control unit 630, and a display unit 640. The communication unit 610 receives a signal from the rectifier 100 (the ground fault overvoltage detection type of ground fault detector) or another control device 600 and transmits an instruction signal for instructing the breaker 400 to break a current based on a determination result of the control unit 630.

For example, the monitoring unit 620 monitors whether to receive a signal indicating that a ground fault is detected from the unbalanced current detection type of ground fault detector 200. When the signal is received, the monitoring unit 620 determines that the ground fault has occurred and outputs a signal indicating that the ground fault has occurred. The monitoring unit 620 and the unbalanced current detection type of ground fault detector 200 may be connected with a signal line or may be connected with individual lines.

Alternatively, the monitoring unit 620 may measure a current (or a voltage) generated due to imbalance of a reciprocating current in a zero-phase current transformer of the unbalanced current detection type of ground fault detector 200. When it is detected that a value of the current is equal to or greater than a threshold, it may be determined that the ground fault has occurred and a signal indicating that the ground fault has occurred may be output.

Based on the signal from the rectifier 100 (the ground fault overvoltage detection type of ground fault detector) and the signal that indicates that the ground fault has occurred and is output from the monitoring unit 620, the control unit 630 determines whether the breaker 400 is instructed to break the current. A specific example of the determination will be described below.

The display unit 640 may be a display, a lamp, an LED, or the like. When the monitoring unit 620 detects the ground fault, the display unit 640 displays information indicating that the ground fault has occurred on a display or lights a lamp, or the like. When the control unit 630 determines that the breaker 400 breaks the current, the display unit 640 displays an information indicating that the current is broken. The display unit 640 may not be provided.

Exemplary Operation of System

Figure 9:
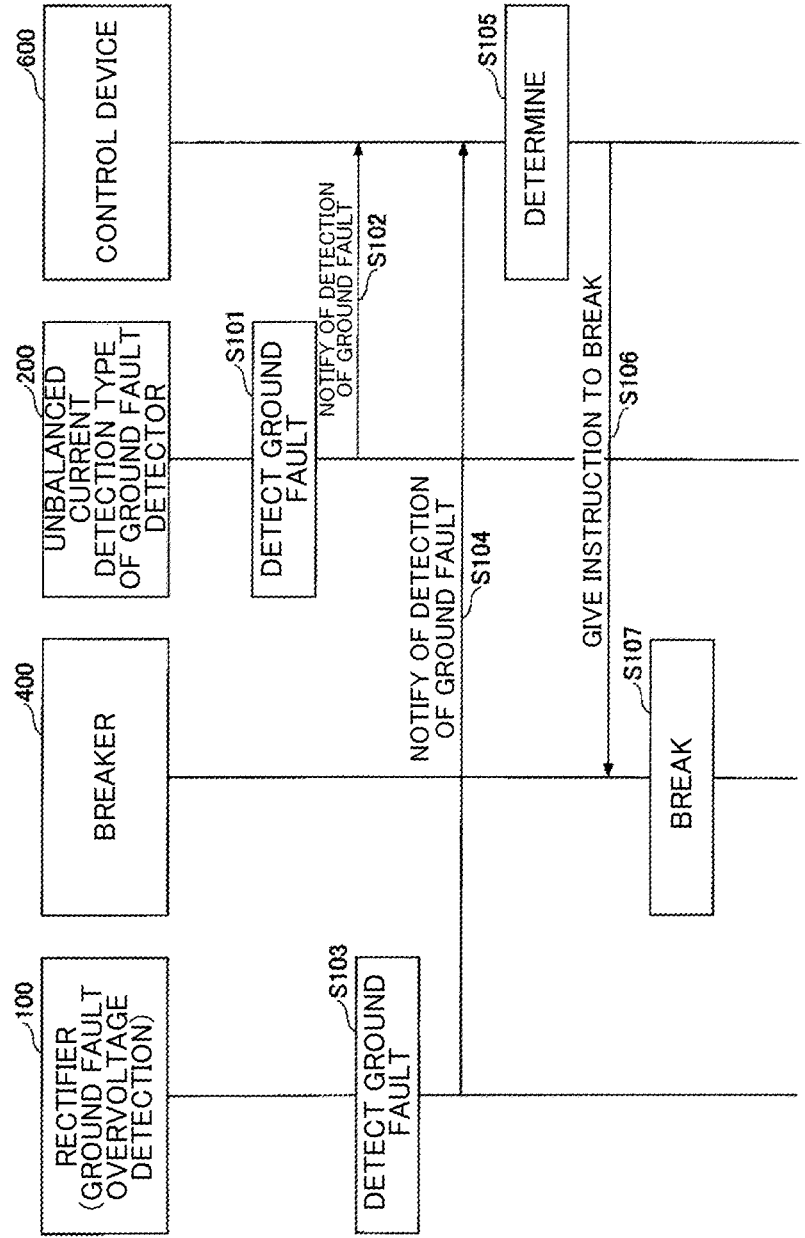
FIG. 9 is a diagram illustrating an example of a processing sequence.

Next, an exemplary operation of the feeding system that has the foregoing configuration will be described with reference to a sequence diagram of FIG. 9. FIG. 9 is a sequence diagram when a distributed unit closest to one certain accident point (referred to as a "distributed unit A" for convenience) is focused on.

In S101, the unbalanced current detection type of ground fault detector 200 detects a ground fault. In S102, a signal for notifying of the detection of the ground fault is transmitted to the control device 600. In the control device 600, the monitoring unit 620 notifies the control unit 630 that the ground fault is detected. At this time, the communication unit 110 of the control device 600 notifies the control devices 600 of the other distributed units that the unbalanced current detection type of ground fault detector 200 of the distributed unit A detects the ground fault.

In S103, the rectifier 100 (the ground fault overvoltage detection type of ground fault detector) detects the ground fault. In S104, the communication unit 110 of the detection device 150 transmits the signal for notifying of the detection of the ground fault to the control device 600. The signal in S104 is transmitted to all the distributed units, but FIG. 9 illustrates only the transmission to the distributed unit A.

In the embodiment, when a ground fault has actually occurred between the load 500 and the unbalanced current detection type of ground fault detector 200, it is assumed that the unbalanced current detection type of ground fault detector 200 detects the ground fault and the rectifier 100 (the ground fault overvoltage detection type of ground fault detector) detects the ground fault. It is also assumed that the unbalanced current detection type of ground fault detector 200 detects (erroneously detects) unbalance (noise) of a minute reciprocating current as a ground fault although the ground fault has not actually occurred.

Based on the foregoing assumption, the control unit 630 of the control device 600 performs any of the following determinations (1) to (4).

Determination (1): the control unit 630 of the control device 600 detects that the unbalanced current detection type of ground fault detector 200 detects the ground fault. When the rectifier 100 (the ground fault overvoltage detection type of ground fault detector) detects that the ground fault is detected, it is determined that the ground fault has occurred between the load 500 and the unbalanced current detection type of ground fault detector 200 of the distributed unit A. In this case, it is determined that the breaker 400 of the distributed unit A breaks the current.

Determination (2): the control unit 630 of the control device 600 detects that the unbalanced current detection type of ground fault detector 200 detects the ground fault. When the rectifier 100 (the ground fault overvoltage detection type of ground fault detector) does not detect that the ground fault is detected, the detection of the ground fault by the unbalanced current detection type of ground fault detector 200 is determined to be erroneous detection (noise) or an erroneous operation. It is determined that the breaker 400 does not perform breaking of the current and the erroneous detection is displayed on the display unit 130.

Determination (3): when it is detected that the unbalanced current detection type of ground fault detector 200 does not detect the ground fault, the unbalanced current detection type of ground fault detectors 200 of the other distributed units do not detect ground faults, and the rectifier 100 (the ground fault overvoltage detection type of ground fault detector) detects the ground fault, the control unit 630 of the control device 600 determines that the ground fault is detected between the rectifier 100 and the unbalanced current detection type of ground fault detector 200. In this case, the breaker 400 does not perform the breaking of the current.

In this case, the breaker 400 may perform the breaking of the current. Determination (4): when it is detected that the unbalanced current detection type of ground fault detector 200 does not detect the ground fault, the unbalanced current detection type of ground fault detector 200 of another distributed unit (for example, the distributed unit B) detects the ground fault, and the rectifier 100 (the ground fault overvoltage detection type of ground fault detector) detects the ground fault, the control unit 630 of the control device 600 determines that the ground fault has occurred between the unbalanced current detection type of ground fault detector 200 of the distributed unit B and the load 500. In this case, since the breaker 400 of the distributed unit B breaks a current of the distributed unit B, the breaking of the current is not performed in the distributed unit A.

The example illustrated in FIG. 9 corresponds to the foregoing determination (1). In S105, the control unit 630 of the control device 600 determines that the ground fault has occurred between the load 500 and the unbalanced current detection type of ground fault detector 200 of the distributed unit A and determines that the breaker 400 breaks a current.

In S106, the communication unit 610 of the control device 600 transmits an instruction signal for instructing the breaker 400 to break the current. In S107, the breaker 400 breaks the current.

Exemplary Hardware Configuration

Each of the detection device 150 and the control device 600 may be implemented, for example, by causing a computer to execute a program describing the processing content described in the embodiment.

The program can be recorded on a computer-readable recording medium (a portable memory or the like) to store or distribute the program. The program can also be provided via a network such as the Internet or an electronic mail.

Figure 10:
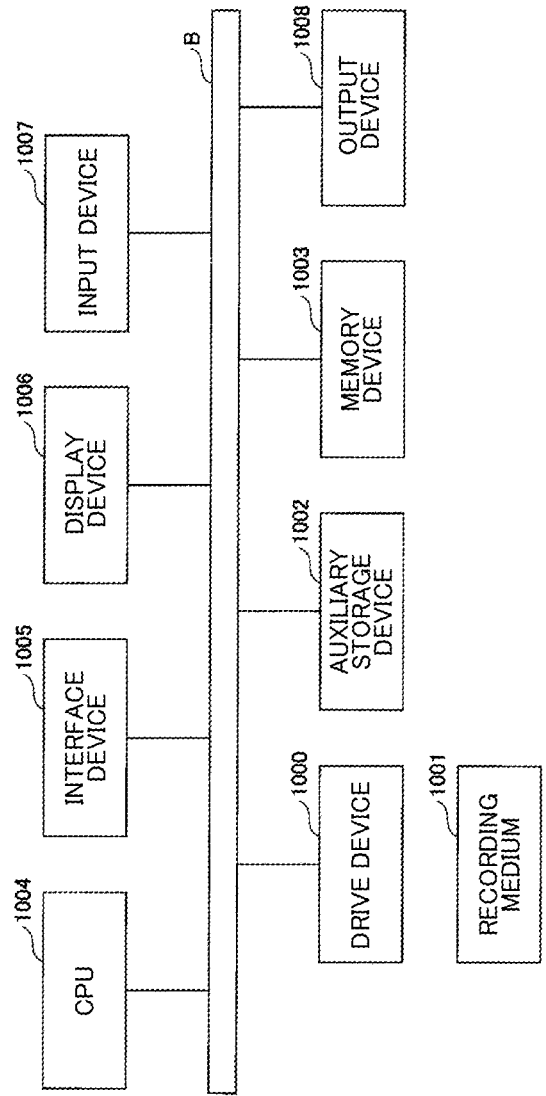
FIG. 10 is a diagram illustrating an exemplary hardware configuration of a device.

FIG. 10 is a diagram illustrating an exemplary hardware configuration of the computer. The computer of FIG. 10 includes a drive device 1000, an auxiliary storage device 1002, a memory device 1003, a CPU 1004, an interface device 1005, a display device 1006, an input device 1007, and an output device 1008 connected to each other via a bus BS.

The program implementing a process in the computer is provided by, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. Here, it is not necessary to install the program from the recording medium 1001, but the program may be downloaded from another computer via a network. The auxiliary storage device 1002 stores the installed program and necessary files, data, and the like.

The memory device 1003 reads the program from the auxiliary storage device 1002 and stores the program when there is an instruction to activate the program. The CPU 1004 implements the function related to the device in accordance with the program stored in the memory device 1003. The interface device 1005 is used as an interface for connecting a network (a signal line). The display device 1006 displays a graphical user interface (GUI) in accordance with the program. The input device 1007 is configured by a keyboard and a mouse, a button, a touch panel, or the like and is used to input various operational instructions. The output device 1008 outputs a calculation result.

Advantage of Embodiment

According to the technology of the embodiment, despite extension of the size of the system, it is possible to detect a ground fault safely without a decrease in resistance of a feeding line to the earth. Compared to a case in which a plurality of ground fault overvoltage detection type of ground fault detectors are provided, cost can be further reduced.

Summary of Embodiment

In the present specification, at least a feeding system, a ground fault detection method, and a program described in each clause are described.

Clause 1

A feeding system that feeds power to a load, the feeding system comprising:
a device configured to has neutral point high-resistance between a feeding line and the earth,
wherein the device functions as a ground fault overvoltage detection type of ground fault detector,
wherein the feeding system further comprises a control device, and
when the ground fault overvoltage detection type of ground fault detector detects a ground fault, the ground fault overvoltage detection type of ground fault detector transmits a signal indicating that the ground fault has occurred to the control device via a signal line.

Clause 2

The feeding system according to clause 1, further including:
a power supply and a plurality of distributed units distributed from a distribution board connected to the power supply,
wherein each distributed unit includes an unbalanced current detection type of ground fault detector, and
wherein, based on a ground fault detection result obtained by the ground fault overvoltage detection type of ground fault detector and a ground fault detection result obtained by the unbalanced current detection type of ground fault detector in a certain specific distributed unit, the control device determines whether a ground fault has occurred in the specific distributed unit.

Clause 3

The feeding system according to clause 2, wherein, when the ground fault overvoltage detection type of ground fault detector detects a ground fault and the unbalanced current detection type of ground fault detector in the specific distributed unit detects that a ground fault is detected, the control device determines that the ground fault has occurred in the specific distributed unit.

Clause 4

The feeding system according to clause 2 or 3, wherein the control device instructs a breaker corresponding to the specific distributed unit in which it is determined that the ground fault has occurred to perform breaking.

Clause 5

A ground fault detection method performed by a feeding system that feeds power to a load,
wherein the feeding system includes only one device has neutral point high-resistance between a feeding line and the earth,
wherein the device functions as a ground fault overvoltage detection type of ground fault detector,
wherein the feeding system further comprises a control device, and
wherein, when the ground fault overvoltage detection type of ground fault detector detects a ground fault, the ground fault overvoltage detection type of ground fault detector transmits a signal indicating that the ground fault has occurred to the control device via a signal line.

Clause 6

A program causing a computer to function as the control device according to any one of clauses 1 to 4.

The embodiment has been described above, but the present invention is not limited to the specific embodiment. Various modifications and changes can be made within the scope of the gist of the present invention described in the claims.

REFERENCE SIGNS LIST 4, 5, 6, 7, 12, 13 Resistance
10, 11 Ground fault overvoltage detection type of ground fault detector
20, 30 Negative-side device
100 Rectifier (ground fault overvoltage detection type of ground fault detector)
110 Communication unit
120 Monitoring unit
130 Display unit
150 Detection device
200 Unbalanced current detection type of ground fault detector
300 Distribution board
400 Breaker
500 Load
600 Control device
610 Communication unit
620 Monitoring unit
630 Control unit
640 Display unit
1000 Drive device
1001 Recording medium
1002 Auxiliary storage device
1003 Memory device
1004 CPU
1005 Interface device
1006 Display device
1007 Input device
1008 Output device

The invention claimed is:

1. A feeding system that feeds power to a load, the feeding system comprising:
a device configured to have neutral point high-resistance between a feeding line and the earth,
wherein the device functions as a ground fault overvoltage detection type of ground fault detector,
wherein the feeding system further comprises a control device, and
wherein, in response to the ground fault overvoltage detection type of ground fault detector detects a ground fault, the ground fault overvoltage detection type of ground fault detector transmits, to the control device via a signal line, a signal indicating that the ground fault has occurred.

2. The feeding system according to claim 1, further comprising:
a power supply and a plurality of distributed units distributed from a distribution board connected to the power supply,
wherein each distributed unit includes an unbalanced current detection type of ground fault detector, and
wherein, based on a ground fault detection result obtained by the ground fault overvoltage detection type of ground fault detector and a ground fault detection result obtained by the unbalanced current detection type of ground fault detector in a certain specific distributed unit, the control device, including one or more processors, is configured to determine whether a ground fault has occurred in the specific distributed unit.

3. The feeding system according to claim 2, wherein, when the ground fault overvoltage detection type of ground fault detector detects a ground fault and the unbalanced current detection type of ground fault detector in the specific distributed unit detects that a ground fault is detected, the control device is configured to determine that the ground fault has occurred in the specific distributed unit.

4. The feeding system according to claim 2, wherein the control device is configured to instruct a breaker corresponding to the specific distributed unit in which it is determined that the ground fault has occurred to perform breaking.

5. A ground fault detection method performed by a feeding system that feeds power to a load,
wherein the feeding system includes only one device that has neutral point high-resistance between a feeding line and the earth,
wherein the device functions as a ground fault overvoltage detection type of ground fault detector,
wherein the feeding system further comprises a control device, and
wherein, in response to the ground fault overvoltage detection type of ground fault detector detects a ground fault, the ground fault overvoltage detection type of ground fault detector transmits, to the control device via a signal line, a signal indicating that the ground fault has occurred.

6. A program causing a computer to function as the control device according to claim 1.

\* \* \* \* \*